United States Patent
McAtarian et al.

(10) Patent No.: US 9,279,532 B2
(45) Date of Patent: Mar. 8, 2016

(54) LEAK DIVERTER ASSEMBLY FOR SUBSTATION TRANSFORMERS

(75) Inventors: Patrick F. McAtarian, St. Mary's, KS (US); Mark McAtarian, St. Mary's, KS (US)

(73) Assignee: Andax Industries, LLC, St. Mary's, KS (US)

( * ) Notice: Subject to any disclaimer, the term of this patent is extended or adjusted under 35 U.S.C. 154(b) by 257 days.

(21) Appl. No.: 13/528,506

(22) Filed: Jun. 20, 2012

(65) Prior Publication Data

US 2013/0341021 A1 Dec. 26, 2013

(51) Int. Cl.
*F16L 55/00* (2006.01)
*F16L 55/07* (2006.01)
*F16L 23/00* (2006.01)

(52) U.S. Cl.
CPC ............... *F16L 55/07* (2013.01); *F16L 23/003* (2013.01)

(58) Field of Classification Search
USPC .................................. 285/13, 419, 924, 373
See application file for complete search history.

(56) References Cited

U.S. PATENT DOCUMENTS

| | | | |
|---|---|---|---|
| 1,108,840 A | 8/1914 | Franke | |
| 3,790,194 A | 2/1974 | Kimberley | |
| 3,861,422 A * | 1/1975 | Christie | 138/99 |
| 4,015,634 A * | 4/1977 | Christie | 138/99 |
| 4,046,406 A | 9/1977 | Press et al. | |
| 4,300,373 A | 11/1981 | Camos et al. | |
| 4,716,926 A | 1/1988 | Jacobs | |
| 5,022,685 A * | 6/1991 | Stiskin et al. | 285/45 |
| 5,141,256 A | 8/1992 | Ziu | |
| 5,234,234 A | 8/1993 | Hearn | |
| 5,348,044 A | 9/1994 | Eugene et al. | |
| 5,368,338 A | 11/1994 | Greene et al. | |
| 5,419,593 A | 5/1995 | Greene et al. | |
| 5,911,155 A * | 6/1999 | Webb | 73/40.5 R |
| 6,220,302 B1 | 4/2001 | Nolley | |
| 6,244,290 B1 | 6/2001 | Reicin et al. | |
| 6,305,719 B1 | 10/2001 | Smith, Jr. et al. | |
| 6,517,122 B1 | 2/2003 | Minemyer | |
| 6,789,584 B2 | 9/2004 | Linam et al. | |
| 7,464,728 B2 | 12/2008 | Cairns | |
| 2004/0118467 A1 | 6/2004 | Fundin et al. | |
| 2004/0227347 A1* | 11/2004 | Fundin et al. | 285/419 |
| 2014/0131991 A1* | 5/2014 | Bellis et al. | 285/13 |

FOREIGN PATENT DOCUMENTS

| | | |
|---|---|---|
| AU | 2009100938 A4 | 10/2009 |
| GB | 2107809 A | 5/1983 |
| KR | 20090038160 A | 4/2009 |

OTHER PUBLICATIONS

International Search Report and Written Opinion dated Oct. 7, 2013 in PCT/US2013/046253 filed Jun. 18, 2013.

* cited by examiner

*Primary Examiner* — Aaron Dunwoody
(74) *Attorney, Agent, or Firm* — Hovey Williams LLP

(57) ABSTRACT

The present invention provides improved diverter assemblies (10) designed for installation on liquid-conveying conduit sections (12) having one or more joints susceptible to leakage of liquid. The assemblies (10) include a plurality of mating housing sections (34, 36) which are releasably interconnected and in surrounding relationship to the conduit sections (12) on opposite sides of the conduit joint(s) to form an overall housing (35) defining anon-sealed enclosure. The housing (35) is equipped with a sump (72) which gravitationally collects escaped liquid. The sump (72) includes a drain outlet (74) for conveying the collected liquid away from the conduit sections (12) for collection or reuse.

33 Claims, 6 Drawing Sheets

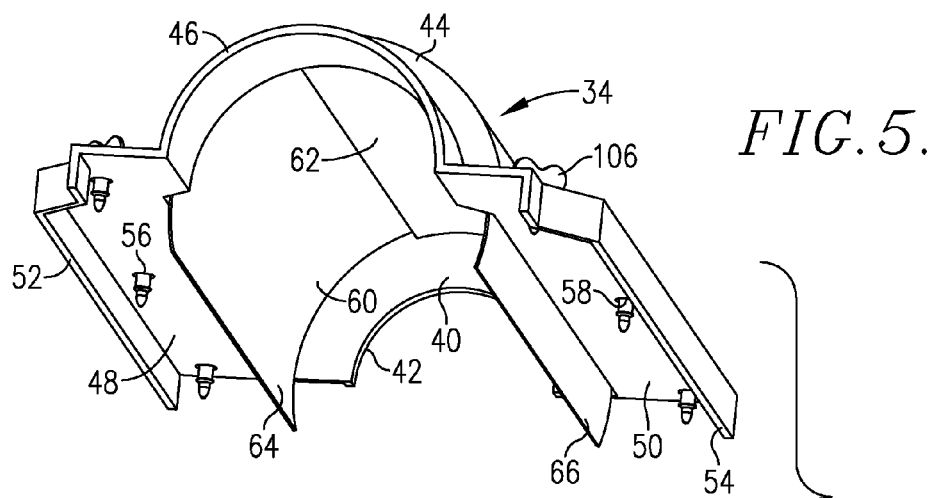
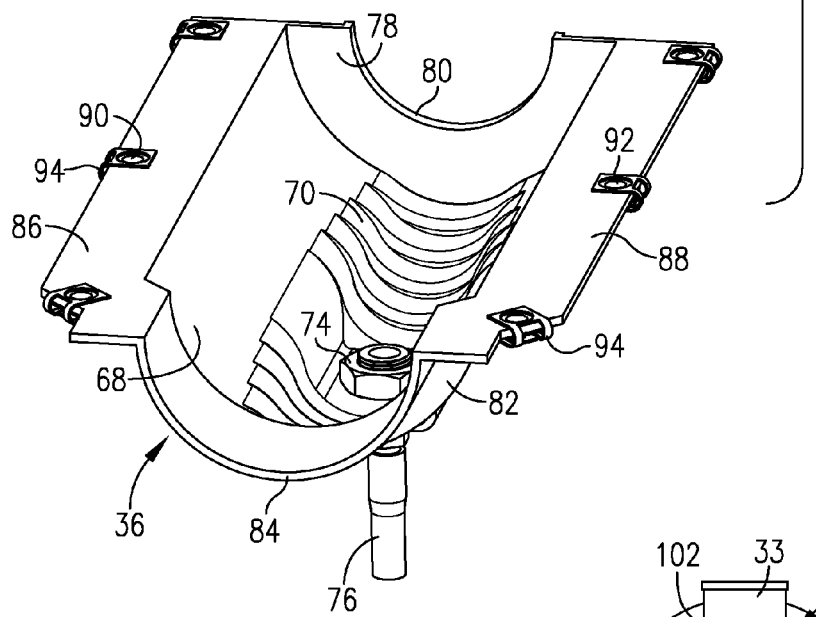
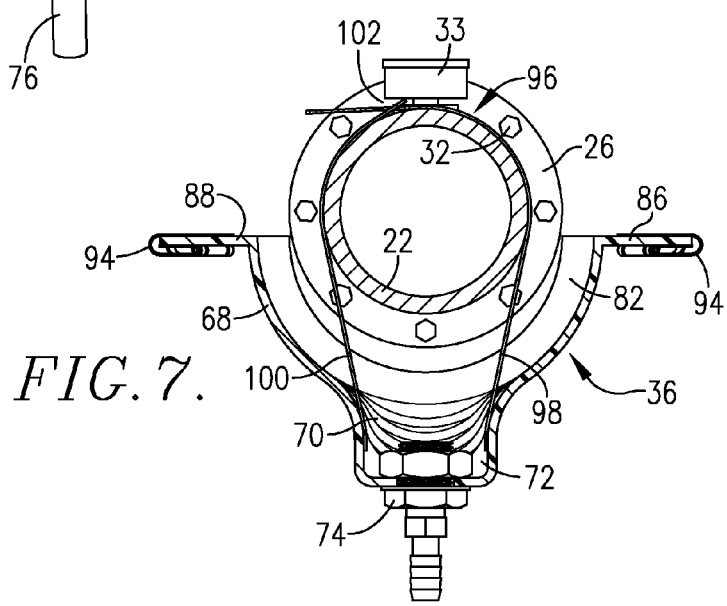
FIG. 5.
FIG. 7.

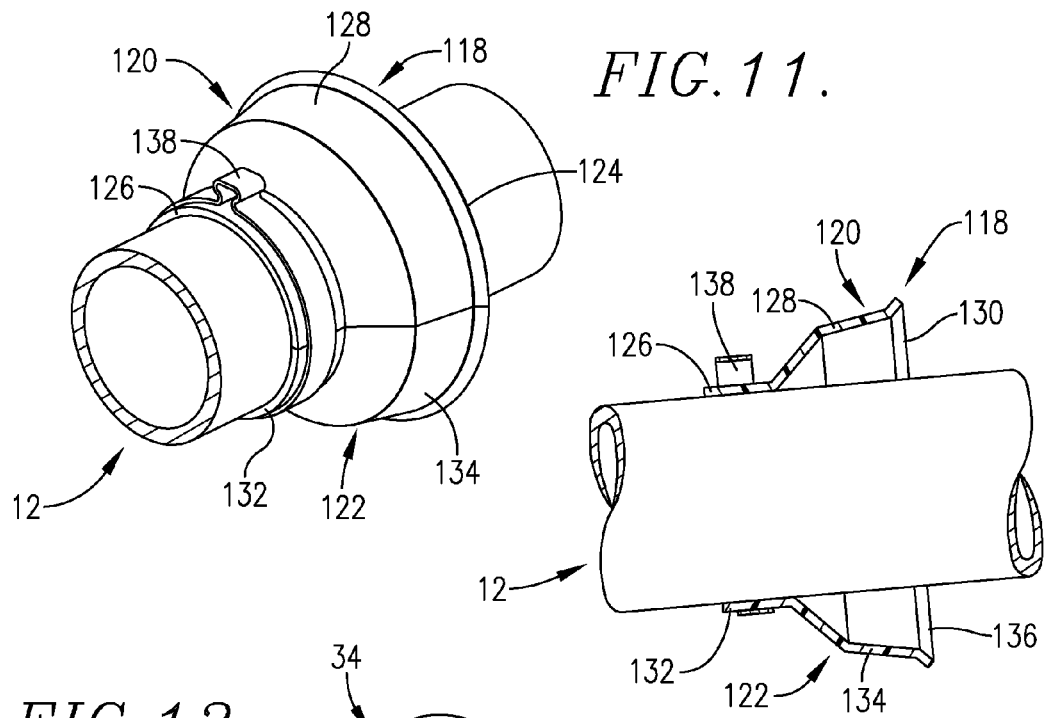
FIG.11.
FIG.12.
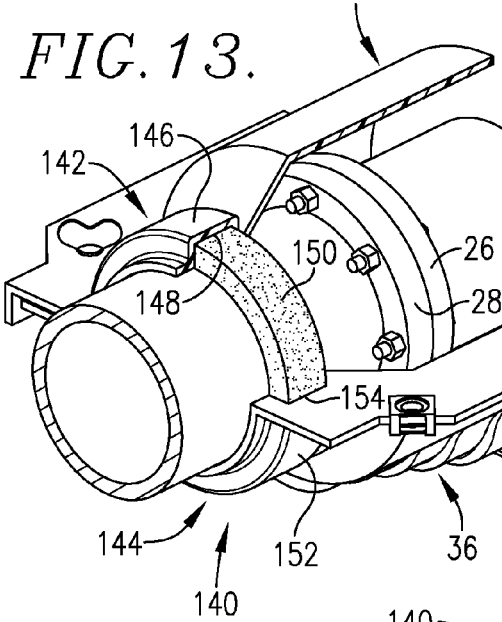
FIG.13.
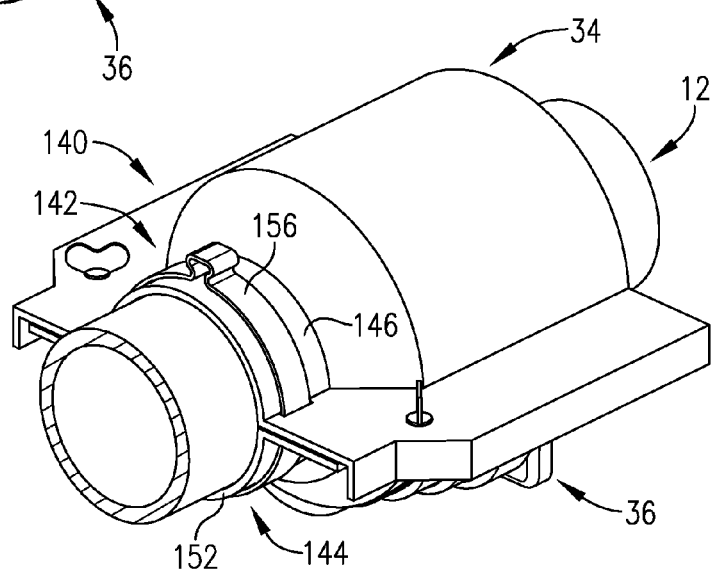
FIG.14.

LEAK DIVERTER ASSEMBLY FOR SUBSTATION TRANSFORMERS

BACKGROUND OF THE INVENTION

1. Field of the Invention

The present invention is broadly concerned with leak diverter assemblies used to divert and collect liquids escaping from a failed joint in a liquid-conveying conduit, pipe, or other structure (referred to generically herein as a "conduit"). More particularly, the invention is concerned with such assemblies, the combination thereof with jointed conduits, and corresponding methods, wherein the diverter assemblies include a housing installed on a conduit to provide a non-sealed enclosure about the conduit, and where the housing includes a drain sump for continuously diverting and collecting leaking liquid. The invention finds particular utility in the protection of jointed oil-conveying conduits associated with substation transformer oil tanks.

2. Description of the Prior Art

Substation electrical transformers include large tanks for holding oil used to cool the transformer during operation thereof. In order to maintain the oil temperature at an appropriate level, it is necessary to continuously circulate the oil from the tank to a heat exchanger. Consequently, conduits are provided between the oil tank and the heat exchanger for handling the flow of oil from the tank to the heat exchanger, and vice-versa. Such conduits typically include a short, flanged stub pipe extending from the oil tank and connected with similarly flanged conduits leading to and from the heat exchanger. These flanged connections or joints are sealed by use of elastomeric O-rings or similar expedients.

Over time, the joints tend to leak oil, usually owing to failure of the O-rings or other sealing devices. This presents a series of significant problems. For example, the leaking oil is an environmental hazard which must be controlled. The straightforward solution of replacing the joint seals is not a realistic proposition in the context of substation transformers. That is, these transformers cannot be easily taken out of service without significant disruptions in electrical output from the substation. Moreover, any effort to replace the joint seals necessitates some means of collecting the very large amount of oil within the transformer oil tank. As a consequence, utilities have not heretofore been able to effectively deal with oil conduit leaks, and have been forced to "live with" the problem. In one reported instance, a substation transformer has been leaking oil in this fashion since 1969, and the utility has been unable to adequately deal with the problem over four decades.

Efforts have been made in the past to provide a way of dealing with liquid-conveying conduit sections having one or more joints susceptible to liquid leakage, both in the context of transformer oil tank conduits and in other areas. Generally speaking, these efforts have been characterized by attempts to provide fully sealed structure which is mounted on the conduits in surrounding relationship to the leaking joint. The goal is thus to contain the leaking liquid in the belief that such would provide a permanent solution.

For example, AU 2009/100938 describes leakproof structure to be applied to an oil-conveying pipe. The intent is to thus contain leaking oil within a housing surrounding the conduit joint. However, this does not provide a permanent solution, inasmuch as the housing seals themselves will ultimately fail. Likewise, KR 2009/0038160 describes a pipe connection cover assembly designed to prevent escape of leaking fluid through use of an end-sealed housing disposed about a conduit joint. Other references of interest include U.S. Pat. Nos. 5,141,256, 6,305,719, 6,789,584, and 7,464,728, and U.S. Patent Publication No. 2004/0118467.

There is accordingly a need in the art for an improved apparatus and method for effectively dealing with liquid conveying conduits having joint(s) susceptible to leakage, and especially conduits which cannot readily be repaired, such as substation transformer oil-conveying conduits.

SUMMARY OF THE INVENTION

The present invention overcomes the problems outlined above and represents a marked departure from prior art efforts to contain liquids leaking from a jointed conduit. Rather than attempting to provide permanent sealing arrangements to confine or otherwise hold in leaked fluid from the conduit, the invention contemplates diverter assemblies which continuously divert leaking liquids in order to allow easy collection thereof without the need to provide a fully sealed enclosure; indeed, fully sealed enclosures are undesirable, inasmuch as such sealed arrangements are inherently subject to failure, and make access to the conduit and joint(s) more difficult.

Generally speaking, the invention is implemented in the context of a liquid-conveying conduit section having a joint susceptible to leakage of liquid, and employs a diverter assembly operably coupled with the conduit section for diverting liquid leaked from the joint away from the conduit section. The diverter assembly comprises an elongated, hollow housing including a plurality of mating housing sections, the housing having a pair of opposed, open ends; usually, the length of the housing is greater than the maximum diameter thereof. The housing is positioned on the conduit section with the housing open ends in surrounding relationship with the conduit section, and with the conduit joint(s) located within the housing cavity between the housing ends. The housing also includes a sump oriented for gravitational collection of liquid leaked from the joint, with the sump having a diverter outlet allowing collected liquid to be drained from the sump. The housing sections are joined by connection structure operable to releasably interconnect at least one of the housing sections to the remainder of the housing so as to allow access to the conduit section and joint within the housing. Importantly, the housing defined by the housing sections creates a non-sealed enclosure about the conduit section and joint, apart from the diverter outlet. As used herein, a "non-sealed enclosure" refers to the fact that at least some or all of the junctures between the housing sections, and/or between the housing and the conduit itself, are not sealed and will, in and of themselves, allow passage of the conduit fluid therethrough. Normally, at least the elongated junctures between the housing sections are not sealed.

In many instances, the conduit section is generally horizontally oriented, and has at least a pair of mating, sealed conduit flanges along the length thereof and defining a conduit joint. Of course, one or more such joints can be present in a given conduit section. Preferably, the housing comprises a pair of generally semi-cylindrical, upper and lower housing sections, with each of the housing sections having a pair of opposed, outwardly projecting connection flanges extending along the lengths thereof. The connection flanges of the housing sections are in opposition to each other to define respective, non-sealed junctures between the housing sections and spaced from the conduit section. The connection structure interconnecting the housing connection flanges is advantageously of the quick-connect variety, e.g., one-quarter turn screw couplers. In such diverter assemblies, the sump would be located in the lower housing section for gravitational flow of leaked liquid into the sump.

The preferred diverter assemblies may also include an internal diverter shield secured to the inner face of the upper housing section and extending downwardly therefrom to cover each of the opposed junctures, whereby leaked liquid is prevented from passing through the junctures. This can be useful in the event that a leak is in the form of a low-velocity spray from the conduit section joint. In such a case, the leaked liquid could conceivably pass through the loosely interconnected housing sections at the junctures thereof. However, such a spray-leak would be readily contained by diverting the leaked fluid toward the lower sump of the diverter assembly.

One of the goals of the invention is to provide a diverter assembly which can be easily opened for visual inspection of the protected conduit section. In case of the preferred diverter assemblies, the lower housing section may be suspended from the conduit section using a hang strap or the like. In this manner, the upper housing section may be detached from the lower housing section to permit the desired inspection, without the need to hold the lower housing section in place.

In certain embodiments of the invention, structure is provided for inhibiting the ingress of water into the housing, which could otherwise dilute the conduit fluid being diverted. Such structure may include a bead of synthetic resin material at one or both of the ends of the housing sections, or an annular diverter assembly mounted on the conduit adjacent one or both ends of the housing. However, even with the use of such water ingress-inhibiting structure, the overall enclosure defined by the housing is non-sealed, apart from the diverter outlet; this condition normally obtains because of the non-sealed nature of the elongated juncture(s) between the housing sections.

BRIEF DESCRIPTION OF THE DRAWINGS

FIG. 5 is an exploded view illustrating the construction of the diverter assembly housing sections;

FIG. 7 is a vertical sectional view illustrating the suspension strap depicted in FIG. 6;

FIG. 11 is a perspective view of the water shedding ring illustrated in FIG. 10;

FIG. 12 is a fragmentary vertical sectional view further illustrating the water shedding ring;

FIG. 13 is a fragmentary perspective view depicting the use of a two-piece annular band of flexible material adjacent one end of the diverter assembly designed to inhibit water ingress; and FIG. 14 is a fragmentary end view illustrating the use of a clamping band disposed about the annular segment.

DETAILED DESCRIPTION OF THE PREFERRED EMBODIMENTS

Figure 1:
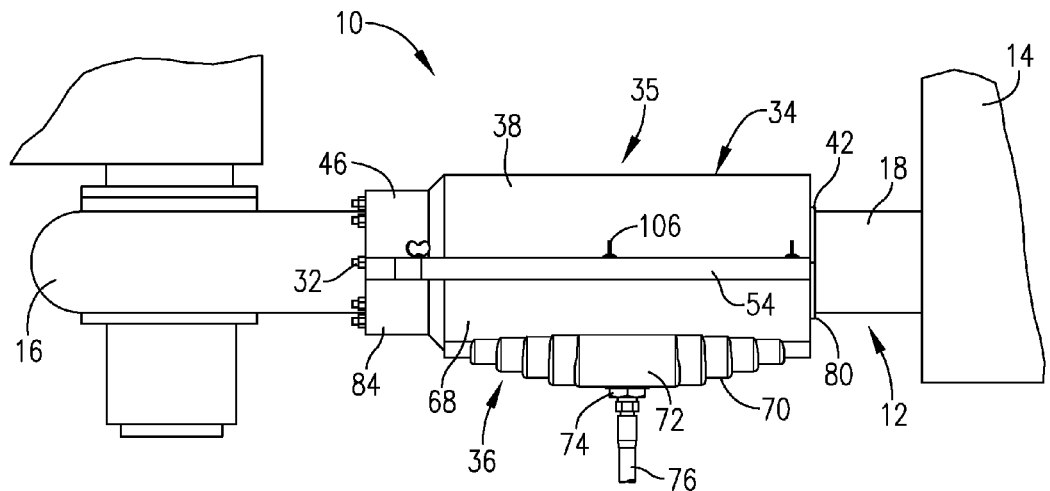
FIG. 1 is a fragmentary side view illustrating a transformer oil tank and external oil-conveying conduit section having a diverter assembly in accordance with the invention mounted on the conduit section.

Turning now to the drawings, a diverter assembly 10 is illustrated in FIG. 1, applied to a conduit section 12. The section 12 extends between a transformer oil tank 14 and a pump 16, the latter serving to convey transformer oil through the conduit section 12 to a heat exchanger or other oil treatment device.

Figure 3:
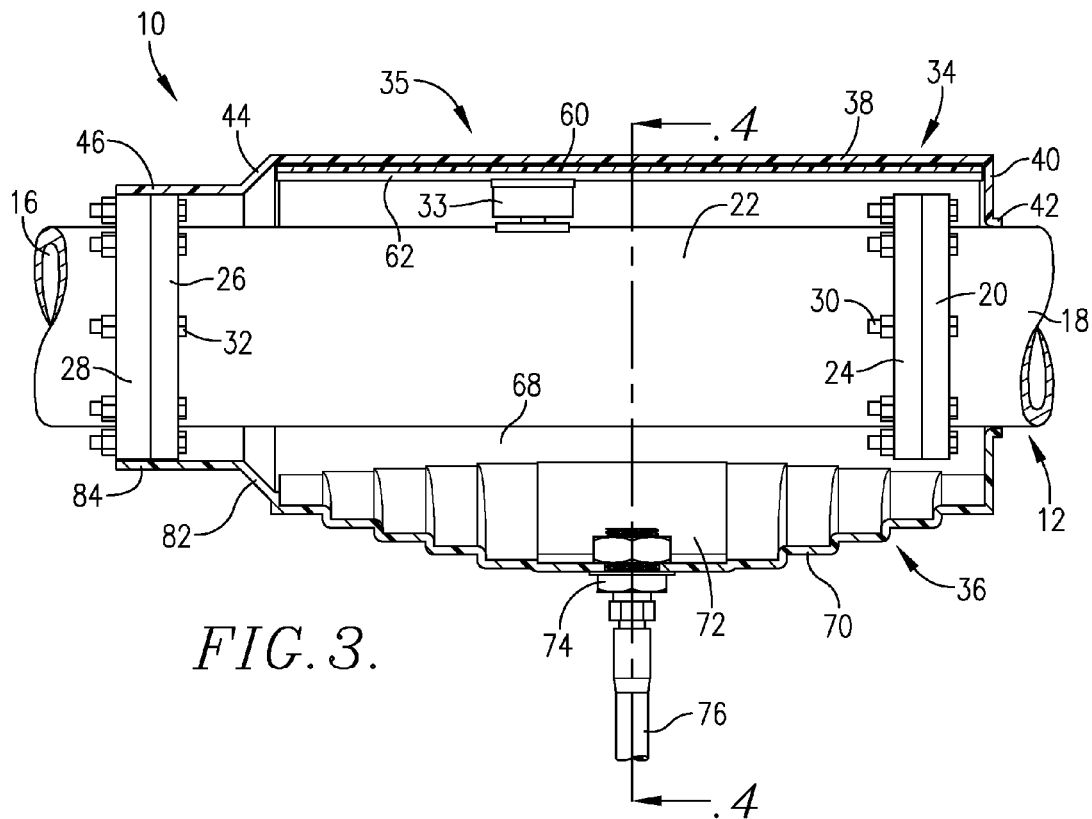
FIG. 3 is a fragmentary vertical sectional view of the conduit section and diverter assembly of FIG. 1.

As best seen in FIG. 3, the conduit section 12 includes a short stub pipe 18 extending outwardly from tank 14 and having a flange 20. An intermediate pipe section 22, equipped with endmost connection flanges 24 and 26, extends from pipe 18 and is coupled with the inlet of pump 16, also having a connection flange 28. Connection bolts 30 and 32 are used to interconnect the abutting flanges 20, 24, and 26, 28, respectively. Although not shown in detail, it will be appreciated that appropriate O-ring or other sealing structure is provided between the abutting flanges to complete the conduit joints. Nonetheless, the sealing structure is susceptible to leakage over time, especially in light of the anticipated long service life of conduit section 12. In this instance, the intermediate pipe section 22 is also equipped with an upstanding gauge 33 allowing visual reading of pressure within the pipe section or other flow-related parameter.

Figure 2:
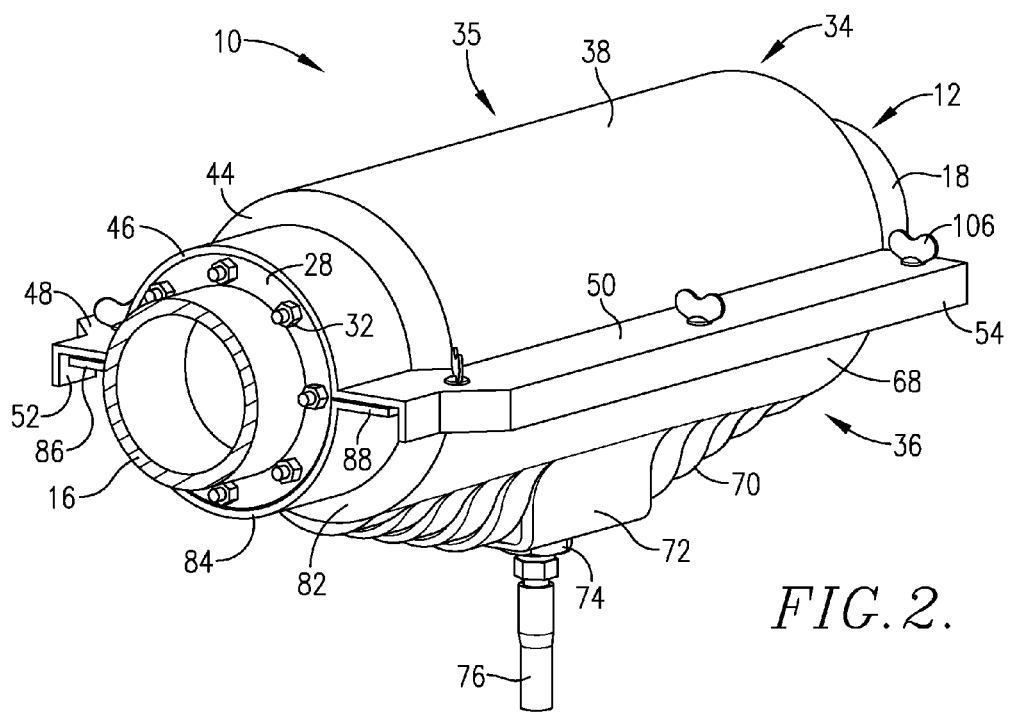
FIG. 2 is a fragmentary perspective view of the conduit section and diverter assembly illustrated in FIG. 1.

The diverter assembly 10 in the depicted embodiment includes mating, integrally formed, synthetic resin upper and lower housing sections 34 and 36 which are designed to be installed on conduit section 12 to cooperatively define a housing 35. The upper housing section 34 includes a primary semicircular wall 38 with a rightmost end wall 40, as viewed in FIG. 3, which terminates with an arcuate lip 42. The leftmost end of wall 38 has a inclined transition wall 44 and an axially projecting, semicircular wall 46. The housing section 34 also has a pair of opposite outwardly extending connection flanges 48 and 50 at the opposed bottom margins of the walls 38, 44, and 46. As best seen in FIGS. 2 and 5, the outer ends of the flanges 48 and 50 have depending skirts 52 and 54. Each of the connection flanges 48, 50 also have a series of spaced through-apertures 56 and 58. The depicted embodiment also makes use of an optional spray-deflecting shield 60 secured to upper housing section 34 by means of connection strap 62. As illustrated, the shield 60 is of frustocircular design, having downwardly extending segments 64 and 66 which extend below the connection flanges 48 and 50, respectively.

The lower housing section 36 is likewise integrally formed of an appropriate synthetic resin material, and has an elongated, transversely arcuate primary wall 68 with a central, laterally extending, stepped segment 70 defining a lowermost sump 72 extending along the length of the lower housing section 36. A drain outlet is provided at the lowermost extent of segment 70, in the form of a conventional drain fixture 74 secured to the segment 70. A flexible drain line 76 is normally attached to the lower end of fixture 74. The right-hand end of wall 68 includes an upwardly extending end wall 78 terminating in a lip 80, whereas the left-hand end of wall 68 has an inclined transition wall 82 and an axially projecting, semicircular wall 84. The upper ends of the walls 68, 82, and 84, and are equipped with laterally outwardly extending connection flanges 86 and 88. These flanges have a plurality of through apertures 90 and 92 along the length thereof, and are moreover equipped with U-shaped connection clips 94.

In the illustrated embodiment, the lower housing section 36 is equipped with an adjustable hanger strap 96 in the form of a pair of synthetic resin strap members 98 and 100, respectively secured to the opposite sides of wall 68, and having upper buckle connection structure 102 allowing the straps to be interconnected and adjusted.

Figure 8:
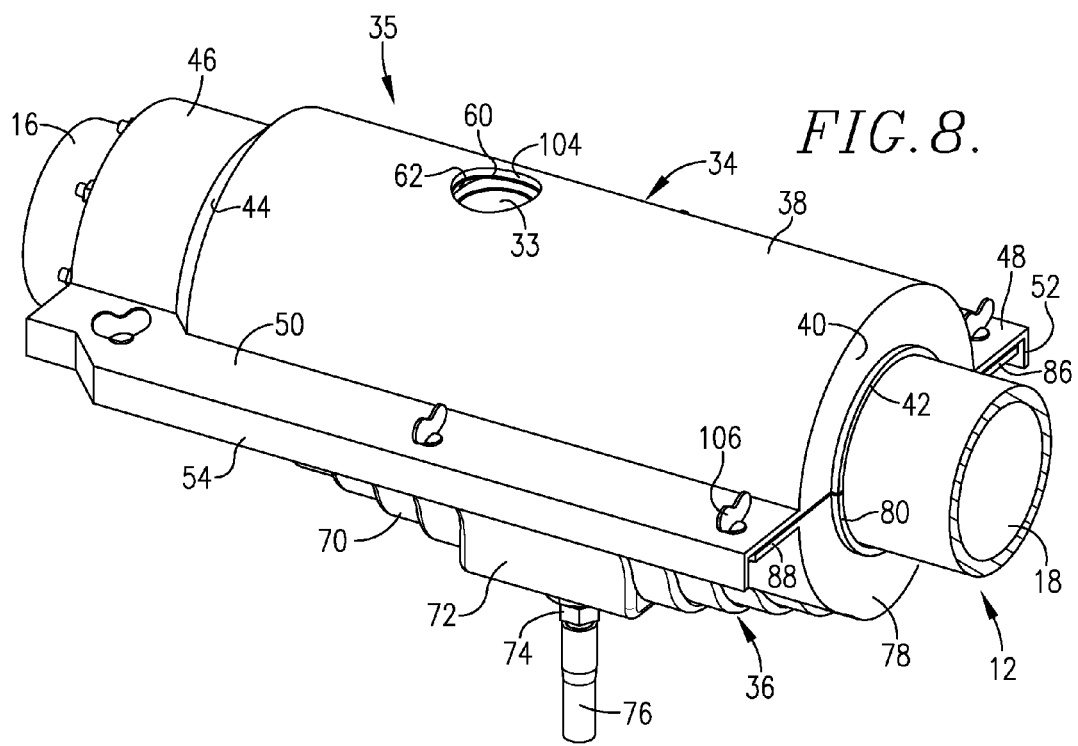
FIG. 8 is a fragmentary perspective view illustrating a modified diverter assembly having a viewing port in the upper housing section thereof.

Another option for diverter assembly is illustrated in FIG. 8, wherein the upper housing wall 38 is equipped with a sighting port 104 extending through wall 38, shield 60, and connection strap 62. The port 104 is located directly above gauge 33, allowing inspection of the gauge without removal of assembly 10 from conduit section 12.

Figure 4:
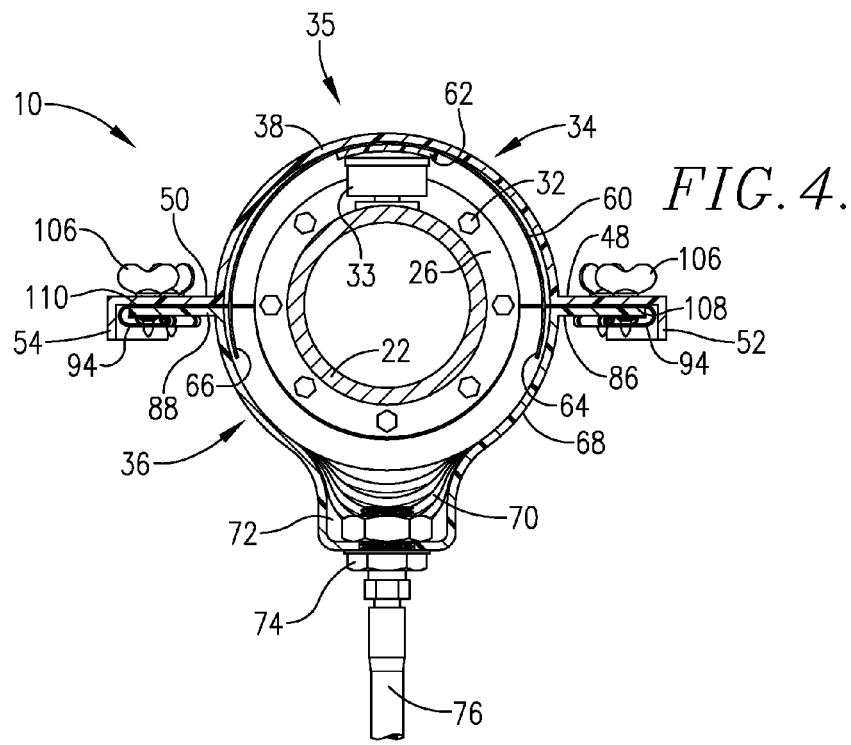
FIG. 4 is a vertical sectional view taken along the line 4-4 of FIG. 3.
Figure 6:
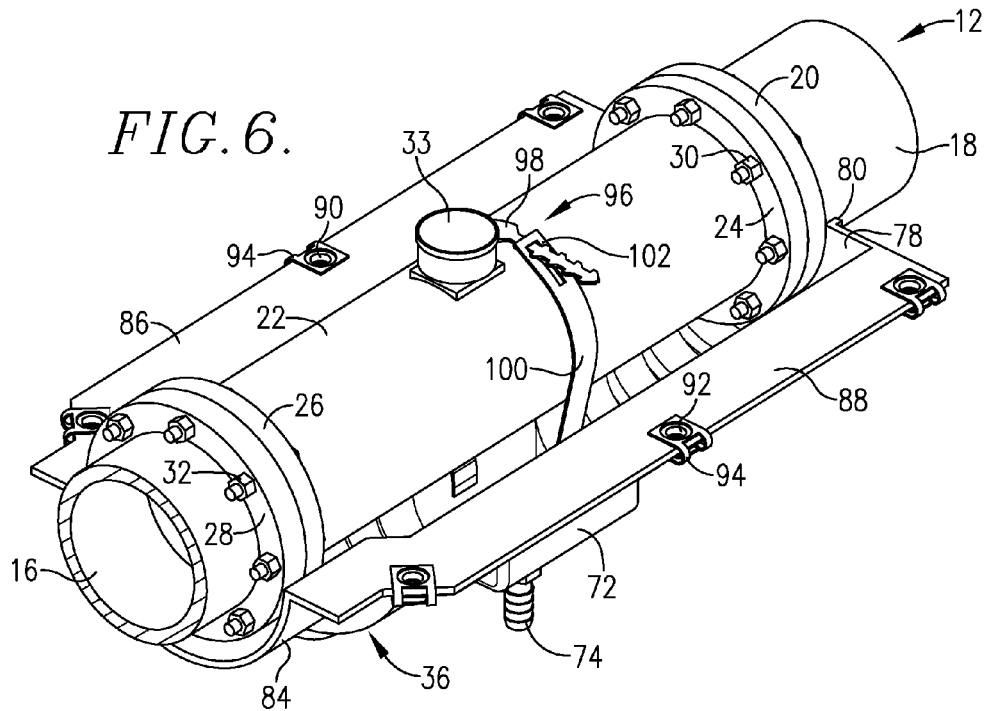
FIG. 6 is a fragmentary perspective view illustrating the use of a suspension strap to maintain the lower housing section on the conduit section.

In the use of assembly 10, the upper and lower sections 34, 36 thereof are installed on conduit section 12. In those embodiments including hanger strap 96, the lower section 36 is first installed, with the strap 96 serving to loosely hold the section 36 in place. If no hanger strap is used, the lower section 36 is merely temporarily held in place by the installer. At this point, the upper section 34 is installed over the conduit section 12, by moving the housing sections 34, 36 together so that the connection flanges 48, 50 come into close, face-to-face adjacency with the lower connection flanges 86, 88 best seen in FIGS. 2 and 4. It will be observed that the skirts 52, 54 are slightly outboard of the outer edges of the flanges 86, 88, in order to inhibit ingress of water into the housing while nonetheless maintaining the non-sealed nature of the elongated junctures between the connection flanges. This also serves to substantially align the apertures 56 and 58 with apertures 92 and 94. The installation is completed by inserting conventional quick-connect screw couplers 106 through the aligned flange apertures with tightening of the couplers 106. Preferably, the couplers 106 are conventional quarter-turn screw couplers, which interconnect the housing sections 34 and 36. In this orientation, it will be appreciated that the lips 42 and 80 of the upper and lower sections engage the stub pipe 18, such is merely a non-sealing abutment, and no effort is made to create a seal at this location. Similarly, the semicircular walls 46 and 84 are in loose contact with the interconnected conduit flanges 26 and 28 without any liquid-tight seal being established. The face-to-face engagement between the connection flanges 48, 50 and 86, 88 establishes elongated juncture lines 108 and 110 (FIG. 4); again, these juncture lines are not sealed in any fashion. It will also be appreciated that the housing sections 34, 36 exert virtually no compressive forces on the conduit section 12, apart form the weight of the housing 35.

In the event that the pipe joint formed by the sealed interconnection of the flanges 20 and 24 develops a leak, it will be appreciated that the flow of liquid passes downwardly into sump 72 and then gravitationally flows through drain fitting 74 and line 76. Such diverted liquid may then be collected in a suitable container (not shown) for disposal or reuse. Assuming that the assembly 10 is equipped with the optional shield 60, any spray leakage from the leaking joint, which may otherwise escape through the juncture lines 108, 110, is diverted downwardly into sump 72.

It will thus be seen that the present invention provides a highly useful means of handling the problem of leaky joints in fluid-conveying conduits in a safe, environmentally friendly way. Moreover, the diverter assemblies of the invention provide an essentially permanent solution, meaning that the assemblies maybe maintained in place indefinitely without fear of failure owing to sealed connections. The loosely interconnected housing sections may also be readily separated for inspection of the protected conduit section and then reattached, without the need for dealing with sealing arrangements typical of prior art pipe joint covers.

Figure 9:
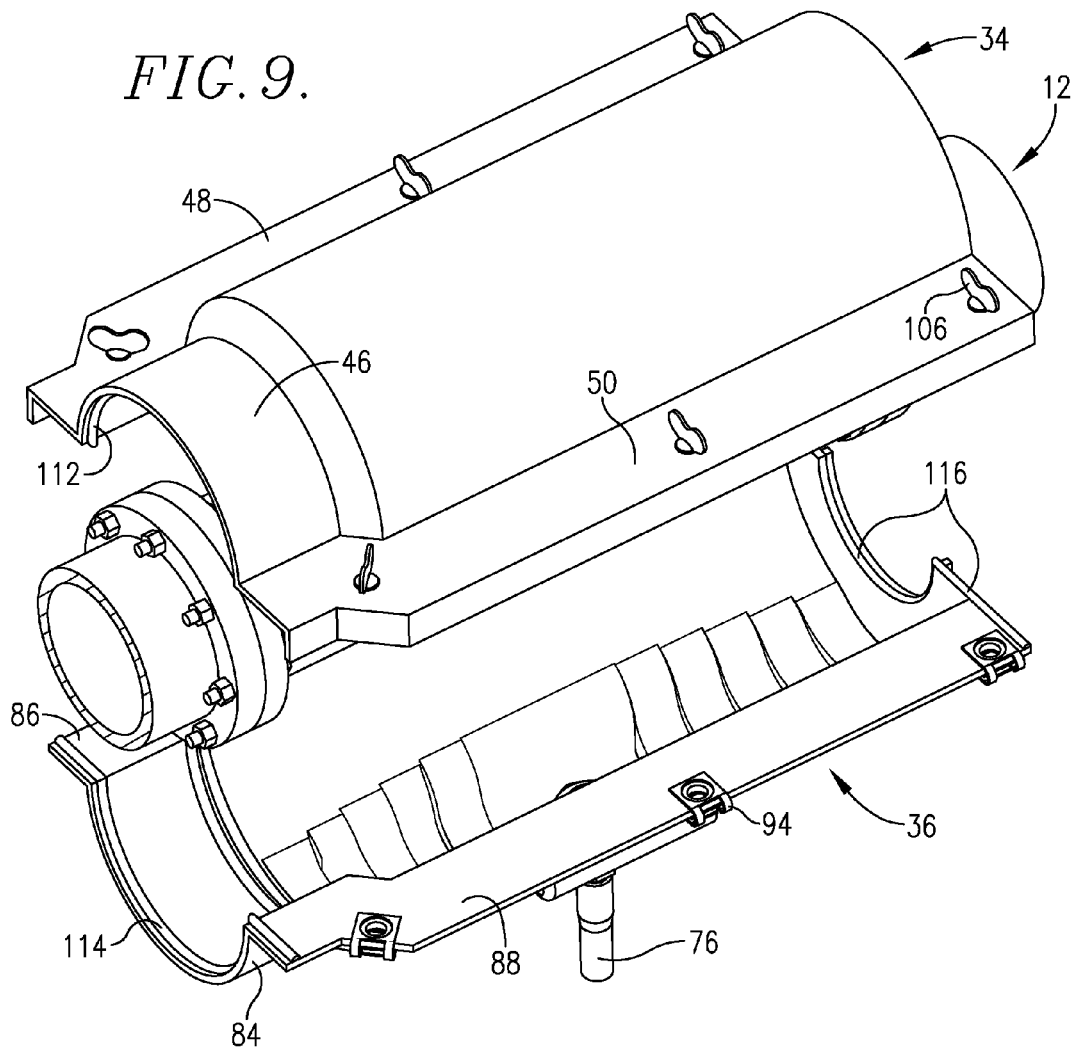
FIG. 9 is a perspective exploded view illustrating the housing sections further depicting the use of synthetic resin beads at the ends of the sections to inhibit ingress of water into the diverter assembly.

In certain instances, it may be desirable to inhibit ingress of water into the housing 35 so as to prevent dilution of the diverted liquid from conduit section 12. In the case of transformer oil leakage, for example, the diverted and collected oil may be reused in the transformer oil tank 14, and therefore water dilution of the oil is to be avoided. To this end (FIG. 9), the inner faces of the semicircular walls 46 and 84 and the adjacent ends of the flanges 48 and 50 may be provided with respective beads 112, 114 of appropriate synthetic resin sealant. The sealant engages the corresponding areas of conduit section 12. In like manner, the arcuate lips 42 and 80, and the adjacent ends of the flanges 86 and 88, may be similarly equipped with sealant beads 116. The provision of the beads 112-116 serves to substantially prevent ingress of water into the confines of housing 35. However, this is not designed to provide pressure seals at the ends of the housing 35, but merely to inhibit the passage of water into the housing. Accordingly, even with the provision of these beads, the overall enclosure defined by the housing 35 is non-sealed as defined above, owing to the non-sealed, elongated juncture line 108 and 110 between the connection flanges 48, 50 of section 34, and the mating connection flanges 86, 88 of section 36.

Figure 10:
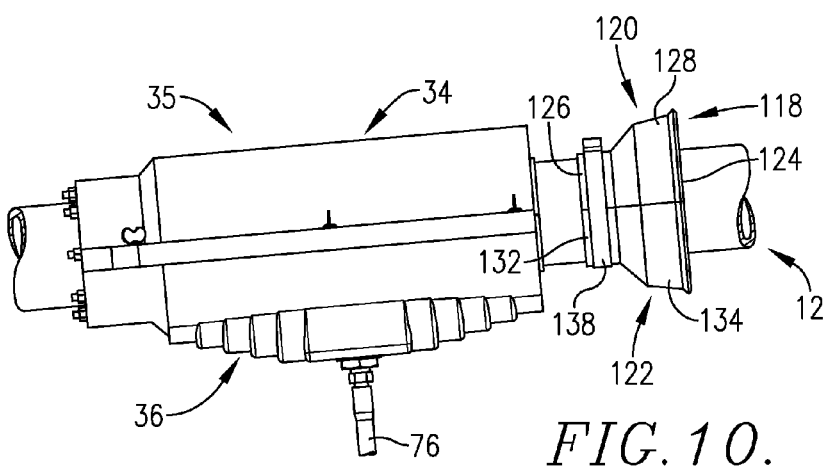
FIG. 10 is a fragmentary elevational view of a modified diverter assembly mounted on a conduit and equipped with a water shedding ring also serving to inhibit the ingress of water into the diverter assembly.

FIGS. 10-12 illustrate the use of another type of structure for inhibiting ingress of water into the housing 35, in the form of a diversion ring assembly 118. As illustrated, assembly 118 includes upper and lower mating sections 120, 122, which cooperatively define a radially enlarged cup-like ring 124 which has the closed end thereof adjacent one or both of the ends of the housing 35, such that water passing along the exterior surface of conduit section 12 or blown towards the adjacent end of the housing during heavy rainfall is diverted from the housing end(s). In more detail, the upper section 120 includes a semicircular flange 126 and an outwardly flared semicircular wall 128 presenting an outermost lip 130. The mating lower section 122 has a semicircular flange 132, an outwardly flared semicircular wall 134 presenting an outermost lip 136. As best seen in FIGS. 11 and 12, the sections 120, 122 are positioned in abutting contact about the conduit section 12 by means of a conventional clamping ring 138. Although the ring assembly 118 is illustrated with ring 124 in an upwardly open position, such position could be reversed to a downwardly opening orientation if desired.

FIGS. 13-14 illustrate another type of water ingress-inhibiting structure 140. The structure 140 includes modified semicircular wall sections 142, 144 used in lieu of the semicircular walls 46 and 84 of the embodiment of FIGS. 1-8. In particular, the wall section 142 is an integral extension of the housing section 34 and includes a semicircular wall 146 presenting an internal recess 148 which is axially spaced from the flanges 26 and 28. The recess 148 receives a semicircular segment 150 of flexible synthetic resin material. Similarly, the wall section 144 is integral with housing section 36 and has a semicircular wall 152 presenting an internal recess 154. The recess 154 likewise receives a semicircular segment of material (not shown). When the modified housing sections are installed on conduit section 12, the flexible material housed within the recess 148 and 154 come into abutting, endwise engagement to create a water ingress barrier about the section 12. If desired, a circular clamp 156 may be applied to the external surfaces of the semicircular walls 146 and 152 to augment the effect of the structure 140.

While a representative diverter assembly has been illustrated in the context of a transformer oil-conveying conduit section, those skilled in the art will appreciate that the invention is not limited to any specific embodiment. For example, the diverter assemblies of the invention may be mounted on other types of jointed conduit sections oriented to various angles, including vertically. The assembly housings may be designed to protect multiple conduit joints, or joints of very different designs. The low cost of the diverter assemblies hereof also makes it possible to custom-design and fabricate unique diverter assemblies for individual jointed conduit sections at a reasonable cost. Additionally, while in preferred forms the diverter assemblies hereof are fabricated from synthetic resin materials, other materials including metal or elastomerics may be used, depending upon the diverter design in question and cost considerations.

We claim:

1. The combination comprising:
   a stationary liquid-conveying conduit section having a stationary joint susceptible to leakage of liquid;
   a diverter assembly operably coupled with said stationary conduit section for diverting liquid leaked from said stationary joint away from said stationary conduit section, said diverter assembly including—
      an elongated, hollow housing comprising a plurality of mating housing sections, said housing having a pair of opposed, open ends,
      said housing positioned on said stationary conduit section with said housing open ends in surrounding relationship to said stationary conduit section and with said stationary joint located between said housing ends,
      said housing including a sump oriented for gravitational collection of liquid leaked from said stationary joint, said sump including a diverter outlet allowing collected liquid to be drained from the sump; and
      connection structure for releasably interconnecting at least one of said housing sections to the remainder of said housing so as to allow access to said stationary conduit section and stationary joint within the housing,
      said diverter assembly providing a non-sealed enclosure about said stationary conduit section, apart from said diverter outlet.

2. The combination of claim 1, said stationary conduit section being generally horizontally oriented, said sump located below said stationary joint.

3. The combination of claim 1, said stationary joint comprising a pair of mating flanges with a seal operable to normally prevent leakage of fluid from the stationary joint, said housing being spaced from said mating flanges.

4. The combination of claim 1, said housing comprising a pair of generally semi-cylindrical, upper and lower housing sections, each of said housing sections having a pair of opposed, outwardly projecting connection flanges extending along the lengths thereof, the connection flanges of the housing sections being in opposition to each other to define non-sealed junctures between the housing sections, said connection structure interconnecting said connection flanges.

5. The combination of claim 4, said connection structure comprising a plurality of quick-connects.

6. The combination of claim 4, including an internal diverter shield secured to the inner face of said upper housing section and extending downwardly therefrom to cover each of said junctures, whereby leaked liquid is prevented from passing through the junctures.

7. The combination of claim 4, including a device for suspending said lower housing section from said stationary conduit section so that, if the upper housing section is detached from the lower housing section, the lower housing section will be maintained adjacent the stationary conduit section.

8. The combination of claim 4, said stationary conduit section including a gauge for monitoring a flow characteristic of the fluid conveyed through said stationary conduit section, one of said housing sections having an observation port allowing reading of said gauge without removal of said housing from said stationary conduit section.

9. The combination of claim 1, said housing sections being separate parts.

10. The combination of claim 1, said stationary conduit section being a transformer oil-conveying conduit.

11. The combination of claim 1, including structure adjacent the open ends of said housing for inhibiting ingress of water into the housing.

12. The combination of claim 11, said structure comprising a synthetic resin bead of material between the open ends of said housing sections and said stationary conduit section.

13. A liquid diverter assembly operable to surround and cover at least one stationary liquid-conveying conduit section having a stationary joint susceptible to leaking and comprising:
   an elongated, hollow housing comprising a plurality of mating housing sections, said housing having a pair of opposed, open ends and operable to be positioned on said stationary conduit section with said housing open ends in surrounding relationship to said stationary conduit section and with said stationary joint located between said housing ends,
   said housing including a sump oriented for gravitational collection of liquid leaked from said stationary joint, said sump including a diverter outlet allowing collected liquid to be drained from the sump; and
   connection structure for releasably and non-sealingly interconnecting at least one of said housing sections to the remainder of said housing so as to allow access to said stationary conduit section and stationary joint within the housing,
   said diverter assembly providing a non-sealed enclosure about said stationary conduit section, apart from said diverter outlet.

14. The assembly of claim 13, said stationary conduit section being generally horizontally oriented, said sump located below said stationary joint.

15. The assembly of claim 13, said stationary joint comprising a pair of mating flanges with a seal operable to normally prevent leakage of fluid from the stationary joint, said housing being spaced from said mating flanges.

16. The assembly of claim 13, said housing comprising a pair of generally semi-cylindrical, upper and lower housing sections, each of said housing sections having a pair of opposed, outwardly projecting connection flanges extending along the lengths thereof, the connection flanges of the housing sections being in opposition to each other to define non-sealed junctures between the housing sections, said connection structure interconnecting said connection flanges.

17. The assembly of claim 16, said connection structure comprising a plurality of quick-connects.

18. The assembly of claim 16, including an internal diverter shield secured to the inner face of said upper housing section and extending downwardly therefrom to cover each of said junctures, whereby leaked liquid is prevented from passing through the junctures.

19. The assembly of claim 16, including a device for suspending said lower housing section from said stationary conduit section so that, if the upper housing section is detached from the lower housing section, the lower housing section will be maintained adjacent the stationary conduit section.

20. The assembly of claim 16, said stationary conduit section including a gauge for monitoring a flow characteristic of the fluid conveyed through said stationary conduit section, one of said housing sections having an observation port allowing reading of said gauge without removal of said housing from said stationary conduit section.

21. The assembly of claim 13, said housing sections being separate parts.

22. The assembly of claim 13, said stationary conduit section being a transformer oil-conveying conduit.

23. The combination of claim 13, including structure adjacent the open ends of said housing for inhibiting ingress of water into the housing.

24. The combination of claim 23, said structure comprising a synthetic resin bead of material between the open ends of said housing sections and said conduit.

25. A method of diverting leaked liquid from a stationary liquid-conveying conduit section having a stationary joint susceptible to leaking, said method comprising the steps of:
positioning a plurality of housing sections about said stationary conduit section to cooperatively form an elongated, hollow housing having a pair of opposed open ends in surrounding relationship to said stationary conduit section, with said stationary joint located between the housing ends, said housing including a sump oriented for gravitational collection of liquid leaked from said stationary joint,
said housing providing a non-sealed enclosure about said stationary conduit section, apart from said diverter outlet; and
when liquid leaks from said stationary liquid-conveying conduit section, diverting said gravitationally collected liquid from said sump.

26. The method of claim 25, including the step of non-sealingly interconnecting said plurality of housing sections.

27. The method of claim 25, said stationary conduit section being substantially horizontally oriented, said method including the steps of positioning upper and lower housing sections about said stationary conduit section to form said housing, and non-sealingly interconnecting the upper and lower housing sections.

28. The method of claim 27, including the step of suspending said lower housing section from said stationary conduit section .

29. The method of claim 27, said housing sections being separate parts.

30. The method of claim 25, said stationary conduit section being a transformer oil-conveying conduit.

31. The method of claim 25, including the step of inhibiting the ingress of water into said housing.

32. The combination of claim 11, said structure comprising an annular, outwardly extending ring adjacent at least one end of said housing and serving to divert water away from said at least one end.

33. The combination of claim 23, said structure comprising an annular, outwardly extending ring adjacent at least one end of said housing and serving to divert water away from said at least one end.

* * * * *